(12) United States Patent
Matsukawa

(10) Patent No.: US 6,810,010 B1
(45) Date of Patent: Oct. 26, 2004

(54) REDUNDANT LAN SYSTEM, ACTIVE LINE/STAND-BY LINE SWITCHING METHOD, AND RECORDING MEDIUM

(75) Inventor: Kenji Matsukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/548,740

(22) Filed: Apr. 13, 2000

(30) Foreign Application Priority Data

Apr. 14, 1999 (JP) ............................................ 11-107104

(51) Int. Cl.⁷ ........................ G01R 31/08; G06F 11/00; G08C 15/00
(52) U.S. Cl. ...................... 370/219; 370/220; 370/242; 709/239; 714/4
(58) Field of Search ............................... 370/216, 217, 370/218, 219, 220, 242, 243, 244, 245; 714/1, 2, 3, 4; 709/238, 239, 242

(56) References Cited

U.S. PATENT DOCUMENTS

| | | | |
|---|---|---|---|
| 5,303,243 A | | 4/1994 | Anezaki |
| 5,572,553 A | * | 11/1996 | Kimiavi et al. ............. 375/344 |
| 5,708,654 A | * | 1/1998 | Arndt et al. ................ 370/242 |
| 6,049,825 A | | 4/2000 | Yamamoto |
| 6,552,997 B1 | * | 4/2003 | Inoue et al. ................ 370/217 |

FOREIGN PATENT DOCUMENTS

| | | |
|---|---|---|
| JP | 01-106637 | 10/1987 |
| JP | 87264129 | 10/1987 |
| JP | 01-106637 | 4/1989 |
| JP | 03-255556 | 3/1990 |
| JP | 9054159 | 3/1990 |
| JP | 05-347609 | 9/1991 |
| JP | 91250896 | 9/1991 |
| JP | 06-197112 | 12/1992 |
| JP | 92347230 | 12/1992 |
| JP | 05-347609 | 12/1993 |
| JP | 09-186686 | 12/1995 |
| JP | 95342165 | 12/1995 |
| JP | 06-197112 | 7/1997 |
| JP | 09-186686 | 7/1997 |
| JP | 9840139 | 2/1998 |
| JP | 10-320327 | 2/1998 |
| JP | 11-313101 | 4/1998 |
| JP | 98131454 | 4/1998 |
| JP | 98365059 | 12/1998 |
| JP | 2000-188605 | 12/1998 |

* cited by examiner

Primary Examiner—Bob A. Phunkulh
(74) Attorney, Agent, or Firm—Foley & Lardner LLP

(57) ABSTRACT

A redundant LAN system is characterized in that with a redundant LAN system which includes sub-LAN systems with redundancy incorporated by an active and a stand-by mode, a plurality of the sub-LAN systems being connected to the same LAN segment, immediately after a sub-LAN system on an active line is switched, ARP packets for updating ARP cache tables of the redundant LAN system from MAC addresses of a previously active line to MAC addresses of a new active line, are transmitted from a sub-LAN system on the new active line to all communication devices connected to the same LAN segment as the sub-LAN system on the new active line.

7 Claims, 4 Drawing Sheets

FIG. 2

B1 ARP CACHE TABLE

| INDEX | IP ADDRESS | MAC ADDRESS |
|---|---|---|
| 1 | IP1 | MAC1 |
| 2 | IP2 | MAC2 |
| 3 | IP3 | MAC3 |
| ⋮ | ⋮ | ⋮ |

B2 ARP ENTRY

REDUNDANT LAN SYSTEM, ACTIVE LINE/ STAND-BY LINE SWITCHING METHOD, AND RECORDING MEDIUM

BACKGROUND OF THE INVENTION

1. Field of the Invention

The present invention relates to a redundant LAN system wherein an active and stand-by switching mode is adopted by a processing device, and to a method of switching between an active line and a stand-by line.

2. Description of the Related Art

In computer LAN network systems, to improve system reliability, redundancy is sometimes incorporated into the system, wherein the processing devices comprising the LAN system are provided with both an active line and stand-by lines in a redundant LAN architecture. In this redundant LAN system, when switching over from the active line to a stand-by line, it is necessary to provide task maintenance to maintain agreement of task status between different processing devices, that is to say, between the active line and the stand-by lines. This is because there is generally a one to one correspondence between LAN connections and tasks in the processing devices, and to maintain the LAN connection it is necessary to maintain the tasks in the processing devices.

However, with the switching method in the abovementioned conventional redundant LAN system, even though the task status is maintained before and after switching between the active line and a stand-by line, the hardware status among the LAN interface devices is not consistent. Consequently, this causes disagreement of the status between sub-LAN systems in the redundant LAN system, and there is a first problem in which it is sometimes necessary to break the communication connection with the other party's communication device, and then re-establish the communication connection.

Furthermore, immediately after a line of the redundant LAN system is switched, an ARP cache table in each communication device on the same LAN segment as the redundant LAN, holds the MAC address of the LAN interface device on the previously active line of the redundant LAN system. Consequently, there is a second problem in that all communication devices on the same LAN segment transmit IP packets to the LAN interface device on the previously active line, and communication with the LAN interface device on the new active line cannot be performed immediately.

SUMMARY OF THE INVENTION

The present invention takes into consideration the situation mentioned above, with the object of providing; a redundant LAN system that maintains an equivalent communication connection to that immediately before switching a line, and enables the resumption of communication on a new active line immediately, a switching method between an active line and a stand-by line, and a recording medium.

In order to solve the above problems, a redundant LAN system according to the present invention is characterized in that with a redundant LAN system which includes sub-LAN systems with redundancy incorporated by an active and a stand-by mode, a plurality of the sub-LAN systems being connected to the same LAN segment, immediately after a sub-LAN system on an active line is switched, ARP packets for updating ARP cache tables of the redundant LAN system from MAC addresses of a previously active line to MAC addresses of a new active line, are transmitted from a sub-LAN system on the new active line to all communication devices connected to the same LAN segment as the sub-LAN system on the new active line.

Moreover, another redundant LAN system according to the present invention, is characterized in that with redundant LAN systems where a plurality thereof are connected to the same LAN segment, each redundant LAN system comprises: a plurality of sub-LAN systems comprising processing devices and LAN interface devices each given its own MAC address and connected to the LAN segment; and an inter-processor communication control device which connects the processing devices with a processor bus, and switches only one of the sub-LAN systems as an active line, the other sub-LAN systems being stand-by lines, and immediately after a sub-LAN system on an active line is switched, ARP packets for updating ARP cache tables of the redundant LAN system from MAC addresses of a previously active line to MAC addresses of a new active line, are transmitted from a sub-LAN system on the new active line to all communication devices connected to the same LAN segment as the sub-LAN system on the new active line.

Furthermore, a method of switching between an active line and a stand-by line according to the present invention is characterized in that with a method of switching between an active line and a stand-by line in a redundant LAN system which includes sub-LAN systems with redundancy incorporated by an active and stand-by mode, a plurality of the sub-LAN systems being connected to the same LAN segment, the switching method comprises: a step for starting an interruption processing program by a processing device in the redundant LAN system when a line switching event occurs; a step for stopping communication of a LAN interface device in the redundant LAN system; a step for dumping a hardware status of a LAN interface device on an active line to a memory in a processing device on the active line, in a situation where the communication is stopped; a step for deciding on a proper new active line by co-operation among the sub-LAN systems and an inter-processor communication control device; a step for copying a program execution status and the dumped memory status of the processing device on a previously active line to the new active line so that the new active line can resume a task from an interruption point of the previously active line; a step for resuming the task from the interruption point of the previously active line by the processing device on the new active line, based on a program execution status copied from the previously active line; a step for setting the LAN interface device on the new active line to resume in the same situation as the LAN interface device on the previously active line that performed the memory dumping; a step for resuming the LAN interface device on the new active line at a time when the resumption setting is completed normally in the LAN interface device on the new active line; and a step for transmitting ARP packets from the sub-LAN system on the new active line immediately after the sub-LAN system on the new active line resumes, notifying the MAC address of the LAN interface device on the new active line to all communication devices in the LAN segment, and updating the ARP entry for the redundant LAN system.

Furthermore, a recording medium according to the present invention is computer readable, and stores a program for a computer to perform this method of switching between an active line and a stand-by line.

Accordingly, with the present invention, in a situation where a communication connection has already been established with an other party's communication device, when line switching takes place in the redundant LAN system, communication on the new active line is immediately resumed without breaking the communication connection with the other party's communication device, maintaining an equivalent communication connection status to that on the previously active line before the line was switched.

That is to say, when switching from an active line to one of the stand-by lines in the redundant LAN system, a new active line takes over the task performance status of the previously active line, maintaining it as it was immediately before switching the line, and resumes from the point of interruption of the previously active line that was interrupted by the line switching. Furthermore, immediately after this line switching is complete, the new active line transmits ARP packets to all communication devices on the same LAN segment so that the ARP cache tables (association tables of MAC addresses to IP addresses of the redundant LAN system) are updated from the MAC address of the LAN interface device on the previously active line to the MAC address of the LAN interface device on the new active line.

In this manner, by combining line switching accompanying task status maintenance from an active line to one of the stand-by lines, with the updating of the ARP cache tables of the redundant LAN system residing in all communication devices of the same LAN segment, the present invention maintains the communication connection status between the new active line and the other party's communication device, enabling communication to resume immediately.

BRIEF DESCRIPTION OF THE DRAWINGS

FIG. 2 shows one example of an ARP cache table used in the present invention.

DESCRIPTION OF THE PREFERRED EMBODIMENTS

Figure 1:
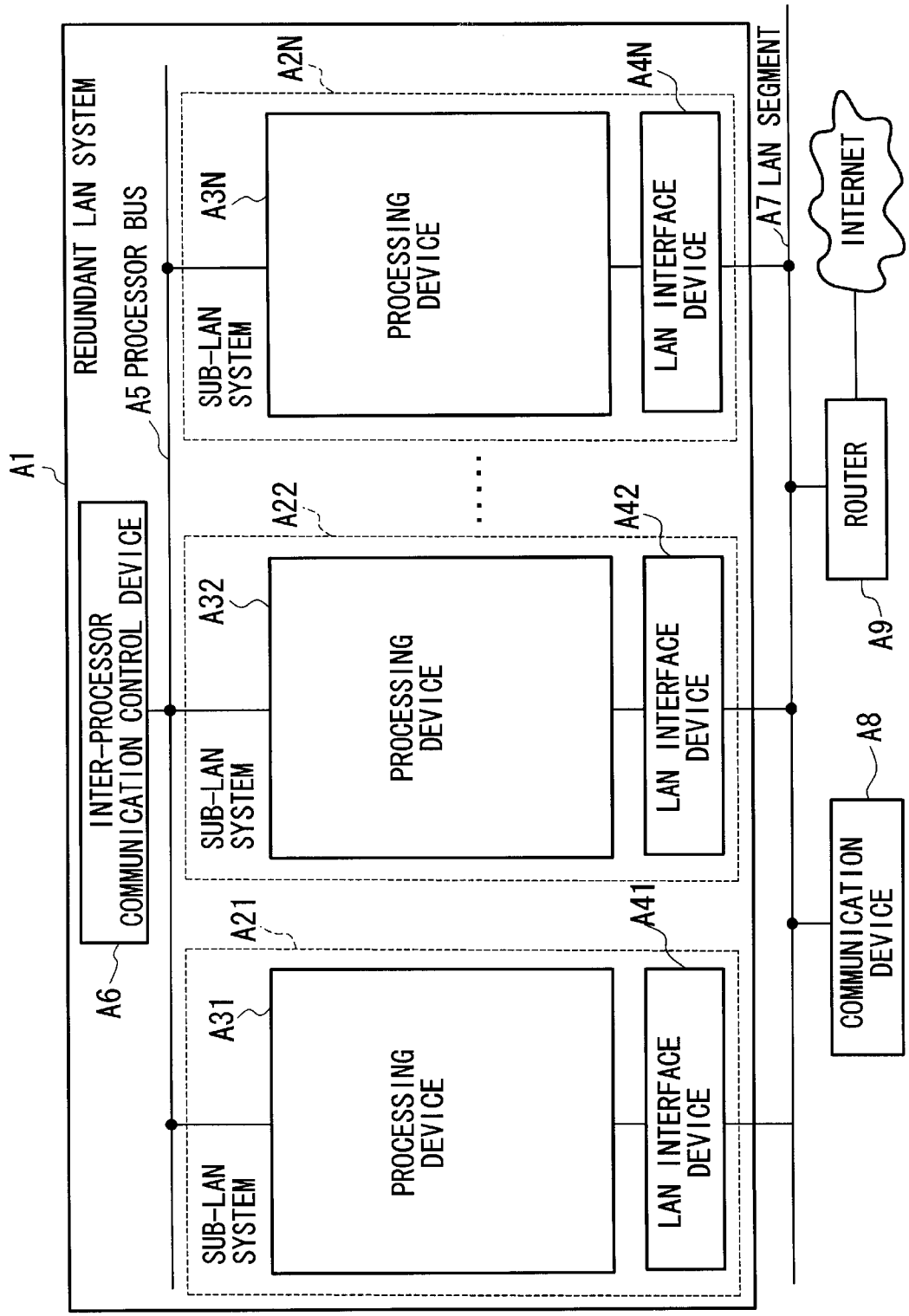
FIG. 1 is a block diagram showing one embodiment of a redundant LAN system of the present invention.

As follows is a description of an embodiment of the present invention with reference to the figures. In FIG. 1, showing one embodiment of the present invention, a redundant LAN system A1 is a communication device in which N sub-LAN systems from A21 to A2N are integrated to form one redundant system. Inside of the sub-LAN systems from A21 to A2N, processing devices A31 through A3N are coupled respectively with LAN interface devices A41 through A4N. Accordingly, there are N processing devices from the processing device A31 to the processing device A3N, and N LAN interface devices from the LAN interface device A41 to the LAN interface device A4N, in the redundant LAN system A1.

The processing devices A31 through A3N in the sub-LAN systems A21 through A2N are interconnected by a processor bus A5, and an inter-processor communication control device A6 performs inter-processor communication control to prepare for switching the system line. The redundant LAN system A1 is a system in which redundancy is incorporated by an active and stand-by mode, and only one sub-LAN system from the sub-LAN systems A21 though A2N performs as an active line, the other sub-LAN systems being in a stand-by status as stand-by lines. A redundancy scheme with an active and stand-by mode, in general, has a hot stand-by mode and a cold stand-by mode, however, the present invention is applicable for either mode without depending on these modes.

The interface devices A41 through A4N in the sub-LAN systems A21 through A2N are interconnected by a LAN segment A7. The redundant LAN system A1 is assigned only one IP address and each of the LAN interface devices A41 through A4N therein is assigned a different address as the MAC (Media Access Control) address so that a structure having one IP address and N MAC addresses is adopted.

An ARP cache table B1 as shown in FIG. 2, exists in each communication device A8 connected to the same LAN segment A7 as the redundant LAN system A1. The ARP cache table is a table comprising a plurality of ARP entries B2 in which the IP address and MAC address correspond to each of the other party's communication devices. When the communication device transmits IP packets, the table is generally used to obtain the MAC addresses associated with the IP addresses of the other party's communication devices.

In the case when the other party's communication device is on the same LAN segment A7 as the redundant LAN system A1, communication between the redundant LAN system A1 and the other party's communication device is performed with the communication device A8, and in the case when the other party's communication device is on a different LAN segment from the redundant LAN system A1, the communication is performed via a router A9, being a network gateway.

In a situation where the communication device A8 or the router A9 has established communication with the redundant LAN system A1, in the ARP entry of the communication device A8 or the router A9 for the redundant LAN system A1, the IP address of the redundant LAN system A1 and the MAC address of one of the LAN interface devices from A41 to A4N which is in an active status, are stored in the IP address section and the MAC address section respectively.

Figure 3:
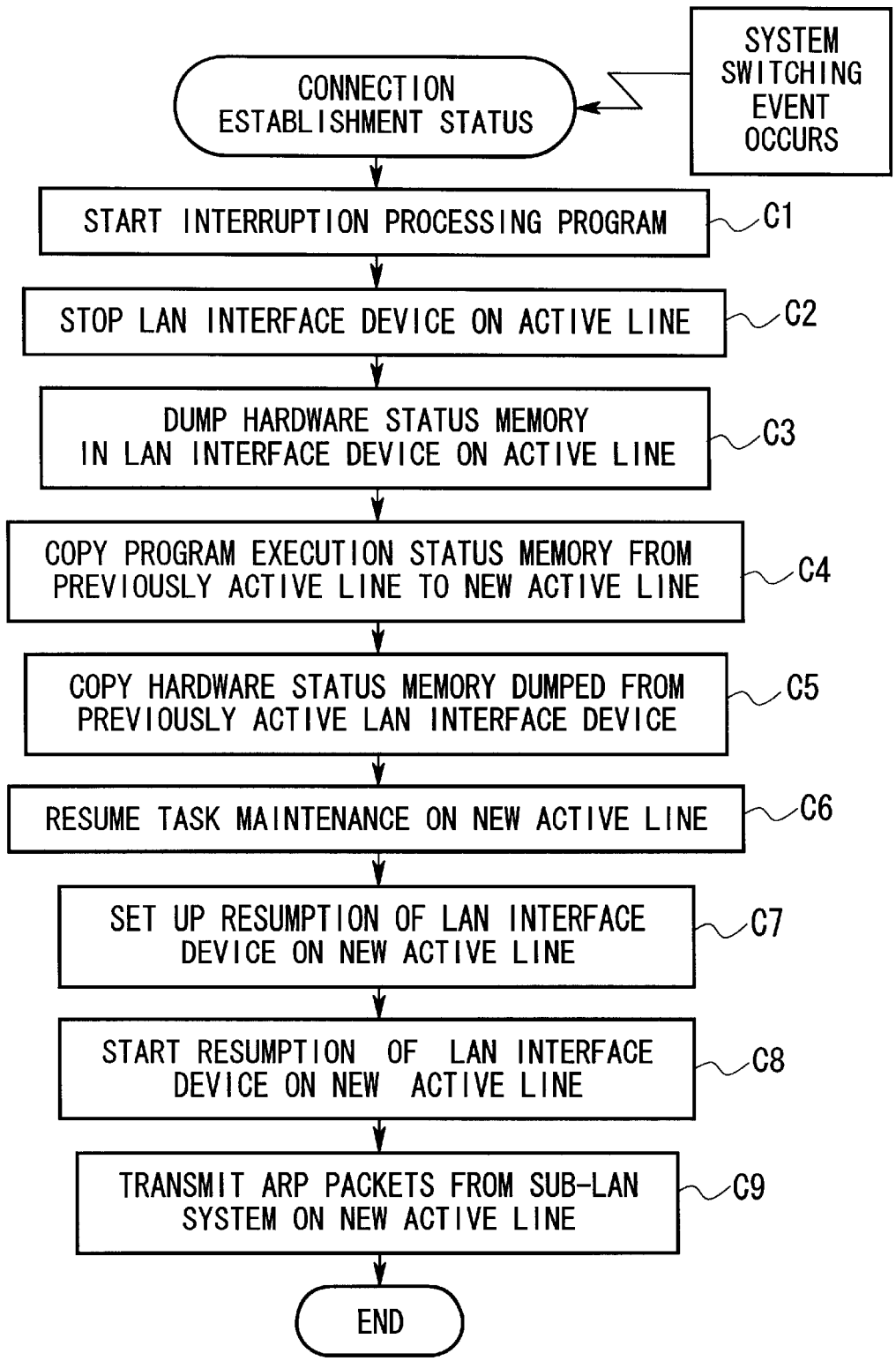
FIG. 3 is a flowchart showing one embodiment of a method of switching between an active line and a stand-by line of the present invention.

Next is a description of the line switching operation in the present redundant LAN system accompanying LAN connection maintenance, with reference to the processing flowchart in FIG. 3.

The redundant LAN system A1 is in a situation where communication has been established via the communication device A8 or the router A9. When a system line switching event occurs in a sub-LAN system on an active line in the redundant LAN system A1, the processing device in the sub-LAN system on the active line starts an interruption processing program (step C1 in FIG. 3), and stops the communication operation in the LAN interface device in the same system (step C2). In the situation where communication is stopped, the processing device on the active line dumps the hardware status of the LAN interface device, such as register status and memory status of the LAN interface device on the active line, to the memory inside the processing device (step C3). The reason for stopping the communication operation of the LAN interface device in step C2 is that, in step C3, it is necessary to reliably dump the hardware status in a situation where the hardware status in the LAN interface device is stopped.

By co-operation between the sub-LAN systems and the inter-processor communication control device A6, an appropriate new active line is determined. With the new active line, the program execution status (register status, stack status, task memory status) in the processing device on the previously active line is copied (step C4) to the new active line to resume the task from the interruption point of the previously active line. At the same time the memory status of the LAN interface device on the previously active line which was dumped in step C3 is also copied (step C5). The detail of the switching accompanying task maintenance among the processing devices is not mentioned here. However, as long as the active and stand-by line switching mode is adopted, whether it is a hot stand-by mode or a cold stand-by mode, the present invention can perform line switching in the same way, as mentioned above.

In the new active line processing device, based on the program execution status copied from the previously active line, task resumption is performed from the interruption point of the previously active line (step C6), and the resumption of the LAN interface device on the new active line is set up in the same situation as the LAN interface device on the previously active line that dumped the memory (step C7). Then, at a point when the resumption set up is completed normally in the LAN interface device on the new active line, the LAN interface device on the new active line is resumed (step C8), and the resumption of the sub-LAN system on the new active line is complete.

A feature of the present invention is that, while various modes are proposed for the line switching mode accompanying the task maintenance among multiple processors, when the system line is switched accompanying LAN connection maintenance in the LAN system, being a combination of a processing device and a LAN interface device, not only the program execution status in the processing device but also the hardware status in the LAN interface device is maintained, so that the communication is resumed on the new active line.

Next, immediately after the new active line sub-LAN system is resumed, the ARP entry B2 of the redundant LAN system A1 exists in all communication devices on the same LAN segment A7 as the redundant LAN system A1. However, although the IP address is the IP address of the redundant LAN system A1, the MAC address stored is still the MAC address of the LAN interface device on the previously active line, so that communication with the sub-LAN system on the new active line cannot be performed as it stands.

Therefore, immediately after the sub-LAN system on the new active line is resumed, ARP packets are transmitted from the sub-LAN system on the new active line (step 9), the MAC address of the LAN interface device on the new active line is notified to all communication devices on the LAN segment A7, and the ARP entry B2 for the redundant LAN system A1 is updated.

Figure 4:
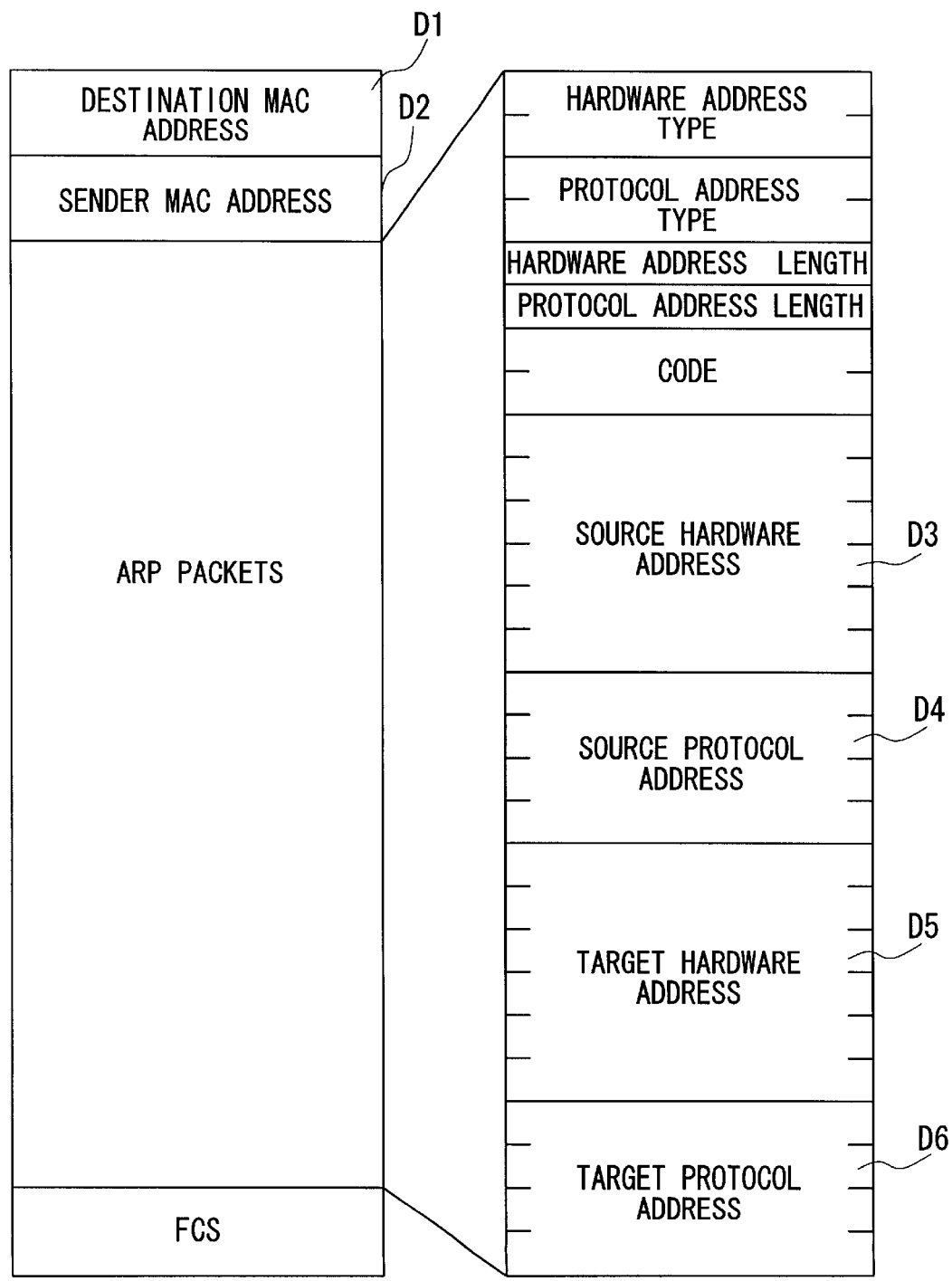
FIG. 4 shows one example of an ARP format used in the present invention.

The contents of a destination address or a sender's address to be transmitted from the sub-LAN system on the new active line to the LAN segment A7 will be explained with reference to the ARP packet format in FIG. 4

A destination MAC address D1 is set to the broadcast address, a sender MAC address D2 and source hardware addresses D3 are set to the MAC address of the LAN interface device on the new active line, source protocol addresses D4 are set to the IP address of the redundant LAN system A1, target hardware addresses D5 are all set to zero, and target protocol addresses D6 are set to the IP address of the redundant LAN system A1.

Here, there is another mode proposed for notifying the MAC address of the LAN interface device on the new active line. In the proposed mode, the IP address of a default router is specified as the target protocol address. However, there may not always be a default router on the LAN segment and also there is a problem in that it is necessary to set up the IP address of the default router on the redundant LAN system in advance.

The present invention is characterized in that, by specifying the IP address of the redundant system A1 itself as the target protocol address, regardless of whether there is a default router or not, and without knowing the IP addresses of other communication devices on the LAN segment A7, ARP packets can always be transmitted.

In this manner, the line switching accompanying the task status maintenance from the active line to one of the stand-by lines is combined with the updating of the ARP cache tables of the redundant LAN system residing in all of the communication devices on the same LAN segment. Therefore an equivalent LAN connection status to the previously active line before performing the line switching is maintained, and communication on the new active line can be resumed immediately.

That is to say, with the present invention, there is an effect in that, after switching the redundant LAN system line, without cutting the already established communication connection with the other party's communication device, an equivalent communication connection status to that on the previously active line before performing the line switching is maintained, so that communication on the new active line can be resumed immediately.

Here, the embodiment described above is explained using a bus network for the LAN segment A7. However, generally, as long as there is a network mode having a network address such as an IP address and a physical address such as a MAC address, the present invention can be applied to a ring network or a star network.

Furthermore, a program for a computer to perform the method of switching between an active line and a stand-by line may be stored on recording media, such as a semiconductor memory, a magnetic disk or the like for the computer to read and execute. The computer performs the same function as the processing device in FIG. 1.

In the above, the embodiments of the present invention have been described in detail with reference to the figures. However, the specific configurations are not limited to these embodiments, and any design changes and the like which do not depart from the gist of the present invention are to be included in the present invention.

What is claimed is:

1. A method of switching between an active line and a stand-by line in a redundant LAN system which includes sub-LAN systems with redundancy incorporated by an active and stand-by mode, a plurality of said sub-LAN systems being connected to the same LAN segment, said switching method comprising:

a step for starting an interruption processing program by a processing device in said redundant LAN systems when a line switching event occurs;

a step for stopping communication of a LAN interface device in said redundant LAN system;

a step for dumping a hardware status of the LAN interface device on an active line to a memory in a processing device on the active line, in a situation where said communication is stopped;

a step for deciding on a new active line by co-operation among the sub-LAN systems and an inter-processor communication control device;

a step for copying a program execution status and memory status of the LAN interface device on a previously active line which was subject to said dumping to the new active line so that the new active line can resume a task from an interruption point of the previously active line;

a step for resuming the task from the interruption point of the previously active line by the processing device on the new active line, based on the program execution status copied from the previously active line;

a step for setting the LAN interface device on the new active line to resume in the same situation as the LAN interface device on the previously active line that was subject to said memory dumping;

a step for resuming the LAN interface device on the new active line at a time when the resumption setting is completed normally in the LAN interface device on the new active line; and a step for transmitting ARP packets from the sub-LAN system on the new active line immediately after the sub-LAN system on the new active line resumes, notifying the MAC address of the LAN interface device on the new active line to all communication devices in the LAN segment, and updating the ARP entry for the redundant LAN system.

2. A computer readable recording medium on which is stored a program for a computer to perform a method of switching between an active line and a stand-by line in a redundant LAN system which includes sub-LAN systems with redundancy incorporated by an active and stand-by mode, a plurality of said sub-LAN system being connected to the same LAN segment, said switching method comprising:

a step for starting an interruption processing program by a processing device in said redundant LAN system when a line switching event occurs;

a step for stopping communication of a LAN interface device in said redundant LAN system;

a step for dumping a hardware status of the LAN interface device on an active line to a memory in a processing device on the active line, in a situation where said communication is stopped;

a step for deciding on a new active line by co-operation among the sub-LAN systems and an inter-processor communication control device;

a step for copying a program execution status and memory status of the LAN interface device on a previously active line that was subject to said memory dumping to the new active line so that the new active line can resume a task from an interruption point of the previously active line;

a step for resuming the task from the interruption point of the previously active line by the processing device on the new active line, based on the program execution status copied from the previously active line;

a step for setting the LAN interface device on the new active line to resume in the same situation as the LAN interface device on the previously active line that was subject to said memory dumping;

a step for resuming the LAN interface device on the new active line at a time when the resumption setting is completed normally in the LAN interface device on the new active line; and a step for transmitting ARP packets from the sub-LAN system on the new active line immediately after the sub-LAN system on the new active line resumes, notifying the MAC address of the LAN interface device on the new active line to all communication devices in the LAN segment, and updating the ARP entry for the redundant LAN system.

3. A redundant LAN system which includes sub-LAN systems with redundancy incorporated by an active and stand-by mode, a plurality of said sub-LAN systems being connected to the same LAN segment, comprising:

means for starting an interruption processing program by a processing device in said redundant LAN systems when a line switching event occurs;

means for stopping communication of a LAN interface device in said redundant LAN system;

means for dumping a hardware status of the LAN interface device on an active line to a memory in a processing device on the active line, in a situation where said communication is stopped;

means for deciding on a new active line by co-operation among the sub-LAN systems and an inter-processor communication control device;

means for copying a program execution status and memory status of the LAN interface device on a previously active line that was subject to said memory dumping to the new active line so that the new active line can resume a task from an interruption point of the previously active line;

means for resuming the task from the interruption point of the previously active line by the processing device on the new active line, based on the program execution status copied from the previously active line;

means for setting the LAN interface device on the new active line to resume in the same situation as the LAN interface device on the previously active line that was subject to said memory dumping;

means for resuming the LAN interface device on the new active line at a time when the resumption setting is completed normally in the LAN interface device on the new active line; and means for transmitting ARP packets from the sub-LAN system on the new active line immediately after the sub-LAN system on the new active line resumes, notifying the MAC address of the LAN interface device on the new active line to all communication devices in the LAN segment, and updating the ARP entry for the redundant LAN system.

4. A system wherein a plurality of redundant LAN systems are connected to the same LAN segment, each redundant LAN system comprising:

a plurality of sub-LAN systems comprising processing devices and LAN interface devices each given its own MAC address and connected to said LAN segment; and an inter-processor communication control device which connects said processing devices with a processor bus, and switches only one of said sub-LAN systems as an active line, the other sub-LAN systems being stand-by lines, wherein:

(a) an interruption processing program is started by one of said processing devices in said redundant LAN system when a line switching event occurs;

(b) when communication of one of said LAN interface devices on an active line in said redundant LAN system is stopped, hardware status of the LAN interface device on the previously active line is dumped to a memory in a processing device on the previously active line;

(c) a new active line is determined by co-operation among the sub-LAN systems and said inter-processor communication control device;

(d) a program execution status and memory status of the LAN interface device on the previously active line that was memory dumped is copied to the new active line so that the new active line can resume a task from an interruption point of the previously active line;

(e) a task is resumed from the interruption point of the previously active line by the processing device on the new active line, based on the program execution status copied from the previously active line;

(f) setting of the LAN interface device on the new active line is performed in order to resume in the same situations the LAN interface device on the previously active line that was memory dumped;

(g) the LAN interface device on the new active line resumes in the same situation as the LAN interface device on the previously active line that was memory dumped, at a time when the resumption setting is completed normally in the LAN interface device on the new active line; and (h) ARP packets from the sub-LAN system on the new active line are transmitted immediately after the sub-LAN system on the new active line resumes, thereby notifying the MAC address of the LAN interface device on the new active line to all communication devices in the LAN segment, and updating the ARP entry for the redundant LAN system.

5. A redundant LAN system according to claim 4, wherein an IP address of said new active line is set up in a target protocol address for said ARP packet.

6. A redundant LAN system according to claim 4, wherein said LAN segment is a bus network, a ring network or a star network.

7. A redundant LAN system according to claim 5, wherein said LAN segment is a bus network, a ring network or a star network.

* * * * *